July 3, 1956 A. C. HAMMER 2,753,109
FLUID PUMPS
Filed Aug. 12, 1952
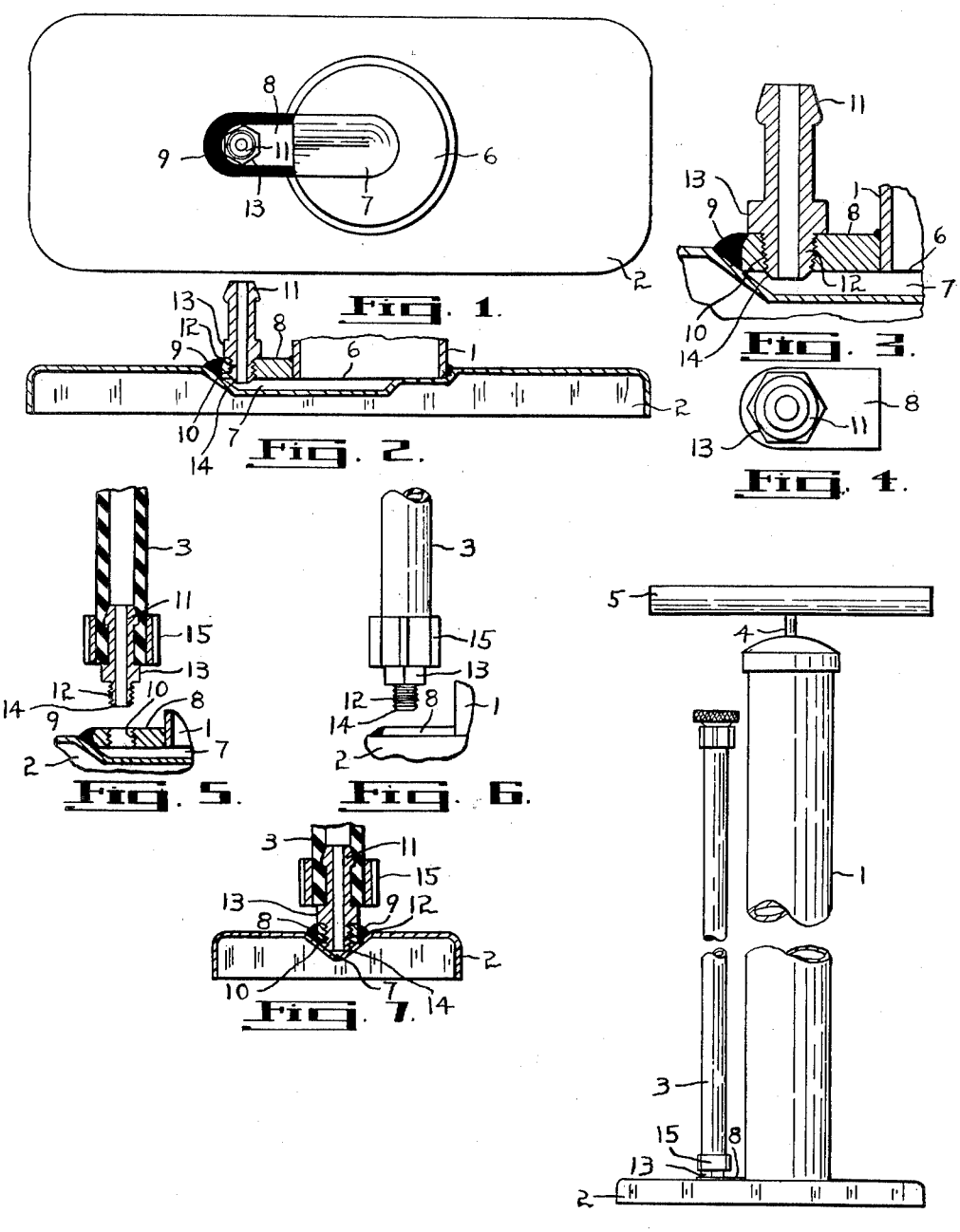
INVENTOR
ALLAN C. HAMMER
by Douglas S. Johnson United States Patent Office 2,753,109
Patented July 3, 1956

2,753,109

FLUID PUMPS

Allan C. Hammer, Toronto, Ontario, Canada

Application August 12, 1952, Serial No. 303,939

Claims priority, application Canada August 14, 1951

4 Claims. (Cl. 230—235)

This invention relates to air pumps of the hand operated type such as used for pumping tires and other inflatable devices, and the principal object of the invention is to provide a very simple and rugged pump construction which will greatly facilitate manufacture, assembly and handling and will eliminate the high incidence of breakage and leaks occurring at the point of connection of the flexible hose with the base.

In the manufacture of hand pumps it is comon practise to form the pump base as a stamping to seat the pump cylinder and to define the air passage leading from the cylinder to the flexible hose assembly. The connection for the hose in such constructions comprises a thin plate brazed to the stamping to seal the air passage and carrying an upright stem to which the hose is crimped after the plate has been brazed.

In this construction the hose assembly is permanently attached to the stamping and unless very great care is taken in the crimping the stem is liable to be broken or the plate displaced with the result that in manufacture there is a high incidence of breakage and the occurrence of leaks at the hose connection.

Moreover, it is difficult to crimp the hose successfully to the stem because of the proximity of the pump cylinder and a defect in the crimping or connection means that the whole unit must be rejected.

Additionally the brazing of the thin plate to the stamping often results in burning of the plate and an improper seal around the plate as a result of the inequality of the heat capacity of the plate and stamping.

Where detachable hose assemblies have been used their construction has necessitated a much more complicated base which materially increases the cost of the pump.

The principal feature of this invention resides in providing a removable hose assembly in conjunction with the simple one-piece base stamping.

A further important feature resides in providing a simple base connection for the hose assembly which will not only permit the ready attachment and detachment of the hose assembly but will overcome the problem of burning and faulty brazing when being attached to the base.

Still a further feature is to provide a connection between the base and hose assembly which will be self-sealing against air leaks without the use of gaskets or other packing means.

With reference to the accompanying drawings, Figure 1 is a plan view of the base stamping with the hose assembly stem attached thereto.

Figure 2 is a longitudinal mid-vertical sectional view of the base of Figure 1 with the pump cylinder in position.

Figure 3 is an enlarged fragmentary vertical sectional detail of the base showing the hose assembly connection.

Figure 4 is a plan view of the hose assembly stem and the base connecting block.

Figure 5 is a view similar to Figure 3 but showing the hose assembly detached from the base connection.

Figure 6 is a fragmentary side elevational view showing the hose assembly detached from its base connection.

Figure 7 is a transverse vertical sectional view through the pump base showing the manner in which the hose assembly stem seats on the wall of the passage formed in the base stamping.

Figure 8 is a side elevational view of the complete pump assembly.

With reference to the drawings, the pump comprises a cylinder 1 mounted on a base 2 to which the flexible hose assembly 3 is connected as shown in Figure 8. The pump piston is operated through the usual rod 4 terminating in the handle 5.

As shown in Figures 1 and 2, the base 2 is a single flanged stamping having a circular seat 6 formed therein to receive the cylinder 1 and a V-shaped channel 7 leading from adjacent the centre of the seat 6 to one side thereof to form a passage to conduct the air away from the bottom of the cylinder.

Overlying this channel 7 to complete the passage is a block 8 having a thickness of the order of twice that of the base material or better. This block abuts the cylinder 1 and seats partially into the V of the channel to define a surrounding well to receive and contain the brazing flux material 9.

In the critical brazing operation the relatively greater thickness of the block 8 provides a substantial heat capacity approaching that of the large area base, and during brazing the surrounding well receiving the flux material 9 can be filled to provide an appreciable bond area around the block without the heat required to produce this weld burning or deleterious effecting the block.

Thus the deep block and the large area of weld not only provides a stronger seal than is heretofore being obtained but additionally enables the welding to be carried out without the critical control previously required to prevent burning of the passage closing block.

The block 8 is provided with a threaded opening 10 slightly tapered towards the bottom and this opening receives the stem 11 of the hose assembly 3. The threaded portion 12 of the stem 11 is tapered correspondingly to the taper of the threaded opening 10 as shown in Figure 3 with the taper of the stem preferably being slightly in excess of the opening to provide an increased binding effect as the stem is threaded into the opening to provide a self seal between the block and stem which eliminates the necessity of any gasket or packing to prevent an air leak at the connection.

Above the threaded stem portion 12 is a multi-sided flange 13 which permits the stem to be gripped by a wrench or suitable tool and threaded tightly down into the opening 10.

The bottom of the stem portion 12 is bevelled at 14 corresponding to the slope of the walls of the channel 7 and this bevelled portion is adapted to seat on the channel walls with the stem threaded fully into the opening 10 as shown in Figure 7. This arrangement permits the penetration of the stem through the block 8 without unseating the block or stressing the weld 9.

The hose assembly 3 is crimped to the stem 11 as shown in Figure 5 to complete the assembly.

It will be appreciated that the hose 3, stem 11 and collar 15 crimped about the hose can be assembled as a separate unit and can be readily handled to provide the proper connection between the stem and hose. Further, the base, cylinder and block 8 can be assembled as a separate unit and the hose assembly then connected.

Since the stem 11 is located adjacent to and is protected by the cylinder 1 and since the crimping of the hose to the stem is done with the stem separated from the block 8, the threaded portion 12 will not be subjected to excessive stresses.

In addition to the increase in heat capacity and the stronger weld obtained by having the block 8 relatively thicker than the stamping, a further inherent advantage in this relative physical relation between the block and stamping is to permit an appreciable depth of thread to be formed in the block to provide the strong and self-sealing connection between the block and stem as heretofore noted.

While the construction and assembly is extremely simple, it will be appreciated that the present invention not only provides a removable hose assembly with a one-piece base stamping but additionally overcomes the disadvantages of high incidence of leaks and burning under welding occasioned by present constructions.

What I claim as my invention is:

1. In a fluid pump a single-piece base stamping, formed with a seat for a pump cylinder, an upright pump cylinder having its lower end secured to said seat, said base being formed with a channel therein leading from said seat, a block thicker than the material of said base overlying said channel and secured to said base and said pump cylinder, to form a passage communicating with said cylinder, said block having a threaded opening therethrough communicating with said passage and a detachable hose assembly having a threaded stem threading into said threaded opening in said block.

2. A device according to claim 1 in which said threaded stem is tapered to seal upon progressive movement into said threaded opening.

3. In a fluid pump, a single-piece base stamping formed to provide a depressed seat formation for a pump cylinder and a depressed V-shaped channel leading from said seat formation, an upright pump cylinder having its lower end secured in said seat, an elongated block of a thickness of the order of at least twice the thickness of the material of said base stamping overlying said depressed V-shaped channel and seating partially down into said V-shaped channel to define a passage leading from said seat formation and a groove around the sides and end of said block remote from said seat, and a fused material securing said block to said base and said pump cylinder and filling said channel, said block having a threaded opening therethrough communicating with said passage, and a hose assembly having a threaded stem, formed with a shoulder, threaded into said opening, said shoulder being seated on said block.

4. A device according to claim 3 in which said threaded stem is tapered and formed with a bevelled end, said bevelled end portion being adapted to seat on the walls of said V-shaped channel upon threading through said opening in said block.

References Cited in the file of this patent

UNITED STATES PATENTS

| | | |
|---|---|---|
| 1,307,039 | Casler | June 17, 1919 |
| 1,447,963 | Coleman | Mar. 13, 1923 |
| 1,693,858 | Myers | Dec. 4, 1928 |

FOREIGN PATENTS

| | | |
|---|---|---|
| 126,933 | Great Britain | May 22, 1919 |